(12) United States Patent
Harada (10) Patent No.: US 11,323,587 B2
(45) Date of Patent: *May 3, 2022

(54) IMAGE FORMING APPARATUS WITH A COMMON OUTPUT SCANNER OUTPUT PATH AND PRINTER OUTPUT PATH, WHEREIN THE OUTPUT SCANNED SHEET IS IN A POSITION DIFFERENT FROM THE PRINTED PAGE IN THE SAME COMMON OUTPUT AREA

(71) Applicant: KYOCERA Document Solutions Inc., Osaka (JP)

(72) Inventor: Hiroyuki Harada, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/030,763

(22) Filed: Sep. 24, 2020

(65) Prior Publication Data

US 2021/0099603 A1 Apr. 1, 2021

(30) Foreign Application Priority Data

Sep. 26, 2019 (JP) .............................. JP2019-176261

(51) Int. Cl.
*H04N 1/00* (2006.01)
*H04N 1/32* (2006.01)
*G06F 3/12* (2006.01)

(52) U.S. Cl.
CPC ....... *H04N 1/3247* (2013.01); *H04N 1/00689* (2013.01); *H04N 1/00697* (2013.01)

(58) Field of Classification Search
CPC ........... H04N 1/00689; H04N 1/00697; H04N 1/0062; H04N 1/00625; H04N 1/00628; H04N 1/00631; H04N 1/00633; H04N 1/00636; H04N 1/00641; H04N 1/00527; H04N 1/3247
USPC ...... 358/1.11–1.18, 498; 271/171, 227, 3.14; 270/58.08; 399/382, 107, 367, 81, 373
See application file for complete search history.

(56) References Cited

U.S. PATENT DOCUMENTS

| 9,944,097 B1 * | 4/2018 | Younis | .................... B65H 85/00 |
| 2005/0151996 A1 * | 7/2005 | Koike | ................ H04N 1/00915 358/1.15 |

(Continued)

FOREIGN PATENT DOCUMENTS

| JP | 07304548 A | * 11/1995 |
| JP | H07-304548 | 11/1995 |

*Primary Examiner* — Chad Dickerson (57) ABSTRACT

An image forming apparatus includes an image scanning device, a printing device, an output tray, and a controller. The image scanning device scans a document image sheet by sheet from a document including plural sheets. The output tray is as an output destination of both the document outputted from the image scanning device and a print sheet outputted from the printing device. The controller is configured to perform a copy operation and causes the printing device to print an image based on the document image in the copy operation. Further, the printing device includes an outlet of the print sheet; and the image scanning device includes an outlet of the document, the outlet of the document outputting the document such that edges of the document and the print sheet in a width direction of the output tray are arranged at positions different from each other.

3 Claims, 6 Drawing Sheets

(56) References Cited

U.S. PATENT DOCUMENTS

| | | | | |
|---|---|---|---|---|
| 2006/0285901 | A1* | 12/2006 | Ootsuka | G03G 15/602 399/367 |
| 2013/0292898 | A1* | 11/2013 | Miyamoto | H04N 1/00758 271/227 |
| 2017/0289387 | A1* | 10/2017 | Yue | B65H 29/58 |
| 2021/0099583 | A1* | 4/2021 | Harada | H04N 1/00037 |

* cited by examiner

IMAGE FORMING APPARATUS WITH A COMMON OUTPUT SCANNER OUTPUT PATH AND PRINTER OUTPUT PATH, WHEREIN THE OUTPUT SCANNED SHEET IS IN A POSITION DIFFERENT FROM THE PRINTED PAGE IN THE SAME COMMON OUTPUT AREA

CROSS-REFERENCE TO RELATED APPLICATIONS

This application relates to and claims priority rights from Japanese Patent Application No. 2019-176261, filed on Sep. 26, 2019, the entire disclosures of which are hereby incorporated by reference herein.

BACKGROUND

1. Field of the Present Disclosure

The present disclosure relates to an image forming apparatus.

2. Description of the Related Art

An image forming apparatus includes a common output transportation path and a common output tray to an image scanning unit and a printing unit, and outputs to the common output tray both of a document after image scanning of the image scanning unit and a print sheet after printing of the printing unit.

However, the aforementioned image forming apparatus outputs both of the document and the print sheet through the common output transportation path to the common output tray in a copy operation, and therefore, when the image scanning and the printing are performed in parallel, the document and the print sheet are mixed on the common output tray, and consequently, a user is required burden to separate the document and the print sheet from each other. Further, if the printing is performed after finishing the image scanning of all of the document, then the copy operation takes a long time and requires a large memory area to temporarily store image data of the scanned document image, and therefore, this manner is not favorable.

SUMMARY

An image forming apparatus according to an aspect of the present disclosure includes an image scanning device, a printing device, an output tray, and a controller. The image scanning device is configured to scan a document image sheet by sheet from a document including plural sheets. The output tray is as an output destination of both the document outputted from the image scanning device and a print sheet outputted from the printing device. The controller is configured to perform a copy operation and causes the printing device to print an image based on the document image in the copy operation. Further, the printing device includes an outlet of the print sheet; and the image scanning device includes an outlet of the document, the outlet of the document outputting the document such that edges of the document and the print sheet in a width direction of the output tray are arranged at positions different from each other.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
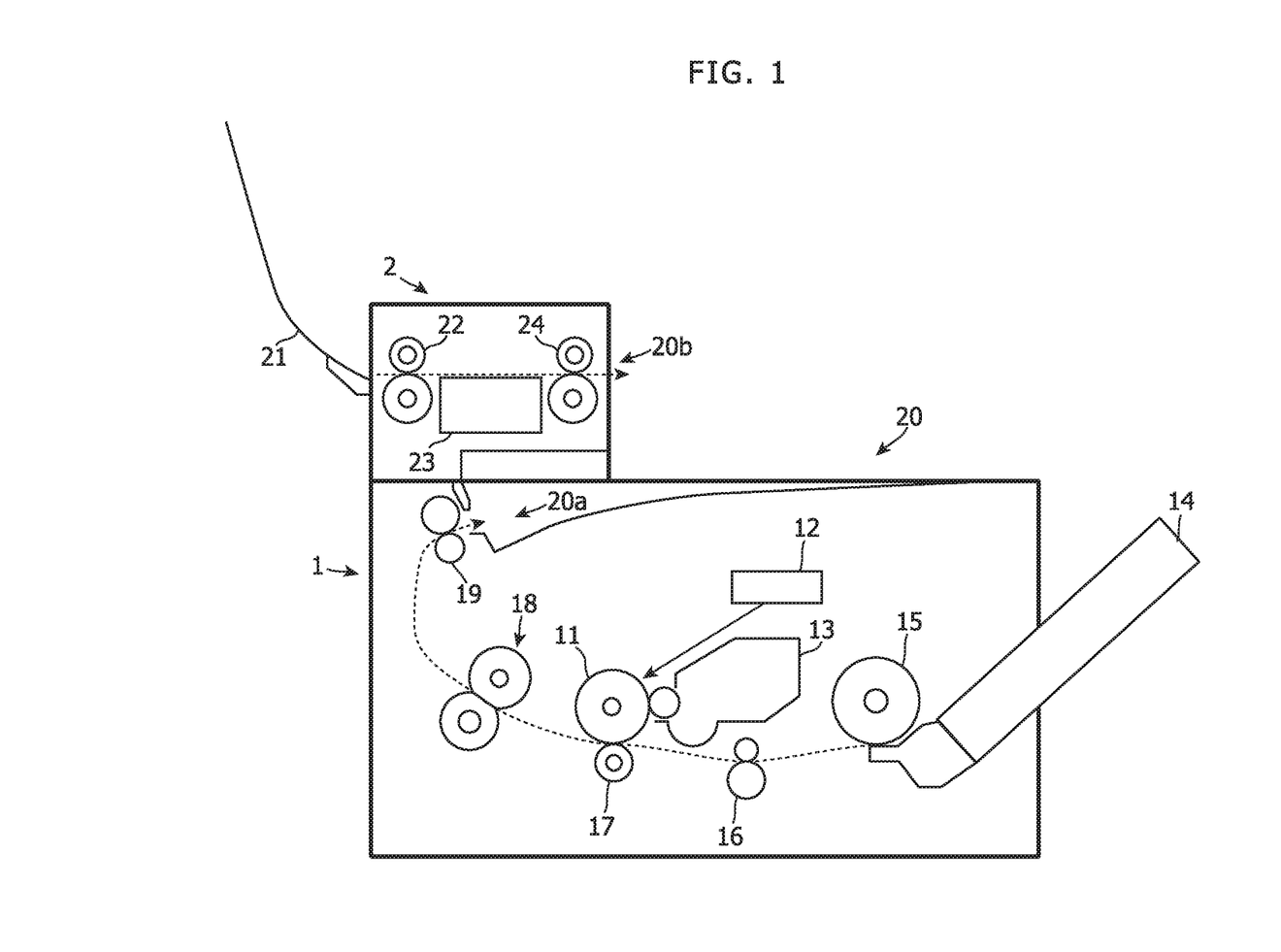
FIG. 1 shows a side view that indicates an internal configuration of an image forming apparatus in an embodiment according to the present disclosure.

FIG. 1 shows a side view that indicates an internal configuration of an image forming apparatus in an embodiment according to the present disclosure. The image forming apparatus shown in FIG. 1 is a copier, a multi function peripheral, or the like, and includes a printing device 1 and an image scanning device 2 that are connected to each other.

The printing device 1 transports a print sheet, prints an image on the print sheet in an electrographic manner, and outputs the print sheet after the printing.

The printing device 1 includes a photoconductor drum 11, an exposure device 12, a development device 13, a sheet feeding cassette 14, a feeding roller 15, a transportation roller 16, a transfer roller 17, a fuser 18, and a transportation roller 19.

The exposure device 12 is a device that scans and irradiates the photoconductor drum 1 with laser light and thereby forms an electrostatic latent image. The photoconductor drum 11 is scanned with the laser light in a direction (a primary scanning direction) perpendicular to a rotation direction (a secondary scanning direction) of the photoconductor drum 11. The exposure device 12 includes a laser scanning unit that includes a laser diode as a light source of the laser light, optical elements (such as lens, mirror and polygon mirror) that guide the laser light to the photoconductor drum 11.

Further, a charging unit, a cleaning device, a static electricity eliminator and the like are disposed in the periphery of the photoconductor drum 11. The cleaning device removes residual toner on the photoconductor drum 11 after transferring a toner image. The static electricity eliminator eliminates static electricity of the photoconductor drum 11 after transferring a toner image.

The development device 13 adheres toner on the electrostatic latent image on photoconductor drum 11, and thereby forms a toner image. The toner is supplied from a toner hopper in a toner cartridge that contains toner.

The sheet feeding cassette 14 stores a print sheet, and for example, pushes up the print sheet using a lift plate (not shown) so as to cause the print sheet to contact with the feeding roller 15. The feeding roller 15 feeds the print sheet sheet by sheet onto a transportation path.

The transfer roller 17 causes the print sheet in transportation by the rollers 15 and 16 to contact with the photoconductor drum 11, and transfers the toner image to the print sheet. The print sheet on which the toner image has been transferred is transported to the fuser 18, and consequently, the toner image is fixed on the print sheet. Further, after the fuser 18 fixes the toner image on the print sheet, the print sheet is outputted through an outlet 20a to an output tray 20 by the transportation roller 19.

The output tray 20 is a common tray that is commonly used as an output destination of the print sheet outputted from the printing device 1 and an output destination of the document outputted from the image scanning device 2. In this embodiment, the image scanning device 2 is arranged on a top surface of a housing of the print device 1, and the output tray 20 is formed on the top surface.

The image scanning device 2 optically scans a document image sheet by sheet from a document including plural sheets. The image scanning device 2 includes a document tray 21, a transportation roller 22, an image scanning unit 23, and a transportation roller 24.

The transportation roller 22 transports the document put on the document tray 21 sheet by sheet. The image scanning unit 23 irradiates the document transported by the transportation roller 22 with light and detects reflection light from the document using an optical sensor, and thereby generates image data of a document image of the document. The transportation roller 24 is arranged in a downstream side of the image scanning unit 23, and outputs the document after the image scanning through the outlet 20b to the output tray 20. The outlet 20b of the document is independently arranged from an outlet 20a of the print sheet, and is arranged at a higher position than the outlet 20a of the print sheet.

Figure 2:
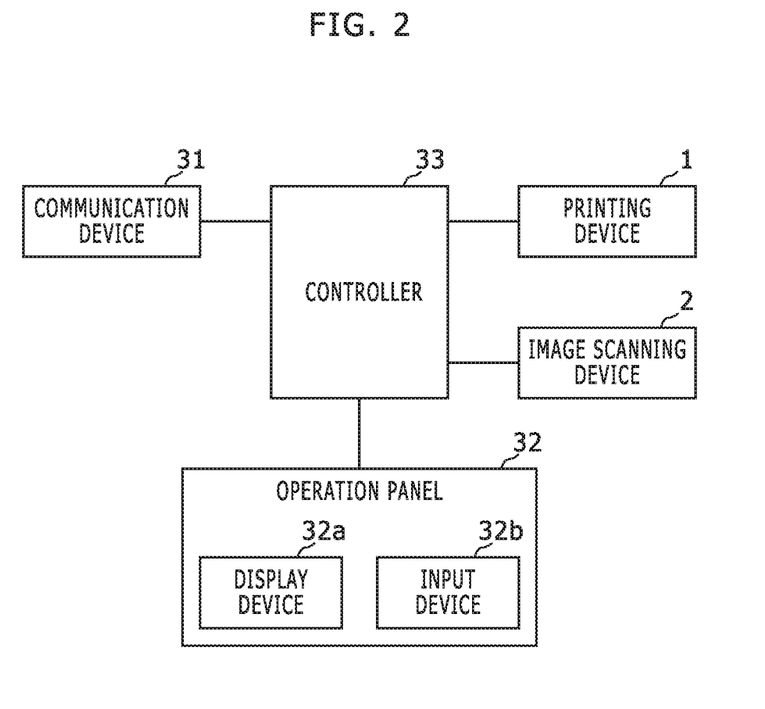
FIG. 2 shows a block diagram that indicates an electronic configuration of the image forming apparatus shown in FIG. 1.

FIG. 2 shows a block diagram that indicates an electronic configuration of the image forming apparatus shown in FIG. 1. As shown in FIG. 2, the present image forming apparatus further includes a communication device 31, an operation panel 32, and a controller 33.

The communication device 31 is a device that performs data communication with an external device. The communication device 31 is a peripheral device interface, a network interface, or the like. The operation panel 32 is arranged on a surface of a housing of the present image forming apparatus, and includes a display device 32a that displays sorts of information to a user and an input device 32b that detects a user operation. For example, the display device 32a includes a liquid crystal display and/or the like, and the input device 32b includes a touch panel, a hard key and/or the like.

The controller 33 includes a processor such as a computer and/or an ASIC (Application Specific Integrated Circuit), and performs a software process and/or a hardware process using the processor and thereby controls the printing device 1, the image scanning device 2 and the like for a copy operation according to a user operation. In the copy operation, the controller 33 causes the printing device to print an image (a scanned document image as is, a combination image of scanned document images, or the like) based on a document image scanned by the image scanning device 2.

Specifically, in the copy operation, the controller 33 causes the image scanning device 2 to obtain image data of document images from a document including plural sheets, performs a predetermined image process for the document images, and causes the printing device 1 to print an image obtained in the image process. In this process, the printing device 1 performs the printing in parallel with the image scanning of the image scanning device 2.

If combination printing is not performed here, the number of sheets of the document outputted from the image scanning device 2 and the number of print sheets outputted from the printing device 1 are identical to each other. If combination printing is performed here, the number of print sheets outputted from the printing device 1 is less than the number of sheets of the document outputted from the image scanning device 2.

Figure 3:
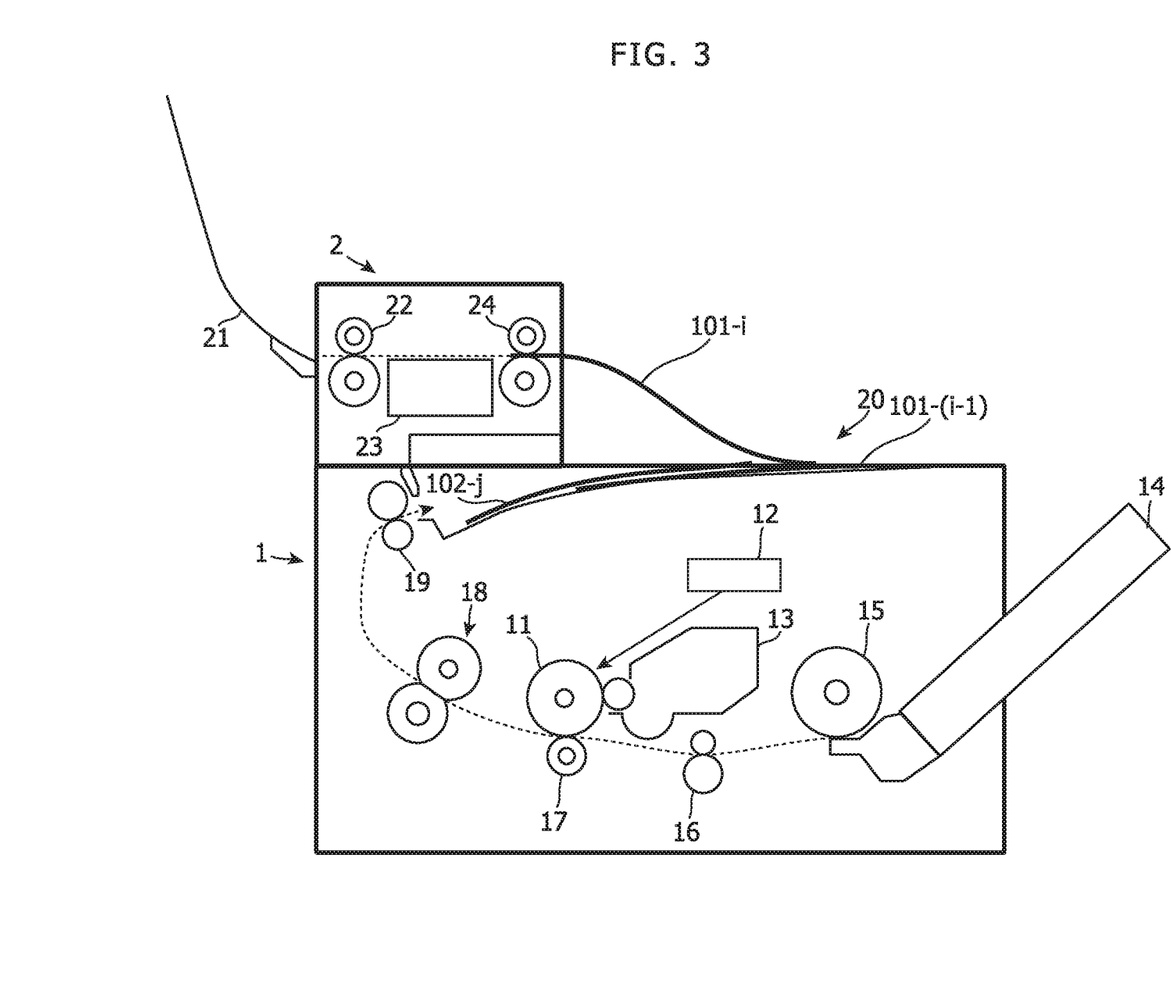
FIG. 3 shows a diagram that explains a document and a print sheet outputted from the image forming apparatus shown in FIGS. 1 and 2 (1/2)
Figure 4:
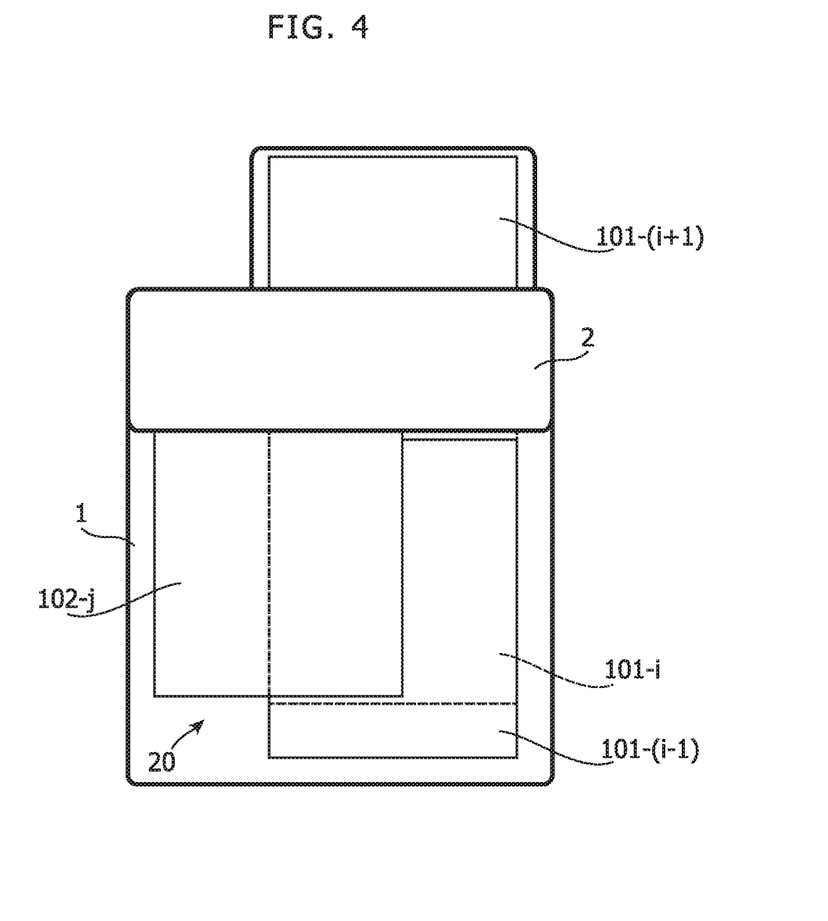
FIG. 4 shows a diagram that explains a document and a print sheet outputted from the image forming apparatus shown in FIGS. 1 and 2 (2/2)

FIG. 3 shows a diagram that explains a document and a print sheet outputted from the image forming apparatus shown in FIGS. 1 and 2 (1/2). FIG. 4 shows a diagram that explains a document and a print sheet outputted from the image forming apparatus shown in FIGS. 1 and 2 (2/2).

Further, in this embodiment, if needed, as shown in FIG. 3 for example, the controller 33 (a) stops transportation of a sheet 101-$i$ ($i$=1, . . . , N, N>1) of the document with nipping a rear end part of the document sheet 101-$i$ using the transportation roller 24 of the image scanning device 2, (b) causes the printing device 1 to output the print sheet 102-$j$ ($j$=1, . . . , M), and (c) causes the image scanning device 2 to resume the transportation of the document sheet 101-$i$ and output the document sheet 101-$i$ after outputting the print sheet 102-$j$.

For example, if it is estimated that a front end of a print sheet 102-$j$ collides with a rear end of a document sheet 101-$i$ that is outputted and falls down, then the controller 33 temporarily stops transportation of the document sheet 101-$i$.

Furthermore, in this embodiment, as shown in FIG. 4, for example, the document sheet 101-$i$ and the print sheet 102-$j$ are outputted such that edges of the document sheet 101-$i$ and the print sheet 102-$j$ (i.e. edges substantially parallel to the output direction) are arranged at positions different from each other in a width direction of the output tray 20 (in a direction perpendicular to an output direction of the document sheet 101-$i$ and the print sheet 102-$j$).

Thus, in the image scanning device 2, the outlet 20b of the document sheet 101-$i$ outputs the document sheet 101-$i$ such that edges of the document sheet 101-$i$ and the print sheet 102-$j$ in a width direction of the output tray 20 are arranged at positions different from each other.

In this embodiment, sizes of the document sheet 101-$i$ and the print sheet 102-$j$ are same as each other, and the document sheet 101-$i$ and the print sheet 102-$j$ are outputted such that centers of the document sheet 101-$i$ and the print sheet 102-$j$ are arranged at different positions from each other. The print sheet 102-$j$ may have a larger size than the document sheet 101-$i$.

Further, the controller 33 may cause the printing device 1 to print on the print sheet 102-$j$ an image to be printed in the copy operation so as to cause the print sheet 102-$j$ to have a reverse orientation to the document sheet 101-$i$. In other words, on the output tray 20, a print image (an image, a text and/or the like) may be rotated if needed so as to arrange a top end of a printing object on the print sheet in a rear end side of the document, and printed after the rotation. Consequently, a user can easily distinguish the document sheet 101-$i$ and the print sheet 102-$j$ on the output tray 20 to each other.

The following part explains a behavior of the image forming apparatus in this embodiment.

A user puts plural sheets 101-1 to 101-N(N>1) of a document on the document tray 21, and performs a predetermined user operation to the input device 32b of the operation panel 32 and thereby sets a print condition such as combination printing and causes the image forming apparatus to perform a copy operation.

When detecting this user operation using the input device 32b, the controller 33 performs the copy operation as follows.

The controller 33 causes the image scanning device 2 to sequentially sheet by sheet perform transportation of a document sheet 101-i and image scanning of a document image of the document sheet 101-i, and thereby obtains image data of the document image; and performs a predetermined image process if needed, prepares an image to be printed, and causes the printing device 1 to print this image.

The controller 33 determines an output timing of a print sheet 102-j, and on the basis of the output timing, determines whether a front end of the print sheet 102-j collides with a rear end of a document sheet 101-i when outputting the print sheet 102-j or not; and if it is estimated that the front end of the print sheet 102-j collides with the rear end of the document sheet 101-i, then as mentioned, the controller 33 causes the image scanning device 2 to temporarily stop transportation of the document sheet 101-i, and resume the transportation of the document sheet 101-i after outputting the print sheet 102-j.

Contrarily, if it is estimated that the front end of the print sheet 102-j does not collide with the rear end of the document sheet 101-i, then as mentioned, the controller 33 causes the printing device 1 to output the print sheet 102-j after the printing without causing the image scanning device 2 to temporarily stop transportation of the document sheet 101-i.

Figure 5:
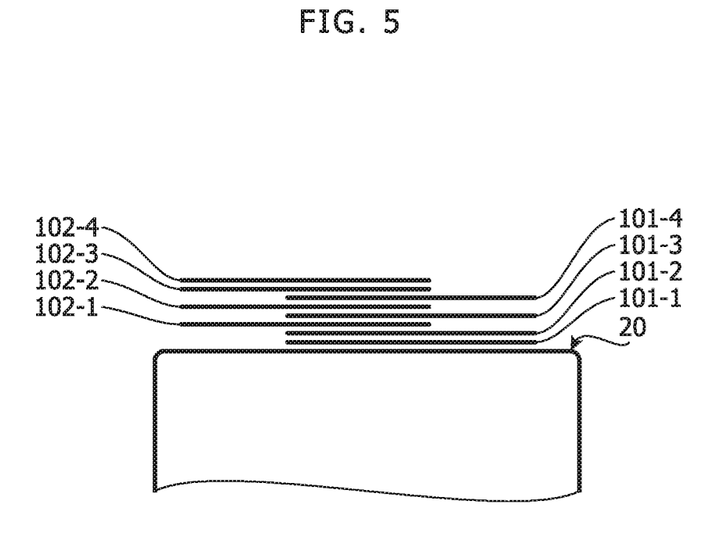
FIG. 5 shows a diagram that explains stacking arrangement of a document sheet 101-$i$ and a print sheet 102-$j$ on an output tray 20 in a copy operation without combination printing in the image forming apparatus shown in FIGS. 1 and 2.

FIG. 5 shows a diagram that explains stacking arrangement of a document sheet 101-i and a print sheet 102-j on an output tray 20 in a copy operation without combination printing in the image forming apparatus shown in FIGS. 1 and 2. If combination printing is not performed, the number of the print sheets 102-j is identical to the number of the document sheet 101-i, and as shown in FIG. 5 for example, after a predetermined delay (in FIG. 5, corresponding to one document sheet 101-i), the print sheet 102-j and the document sheet 101-i are stacked alternately on the output tray 20. In FIG. 5, four print sheets 102-1 to 102-4 are outputted correspondingly to four document sheets 101-1 to 101-4.

Figure 6:
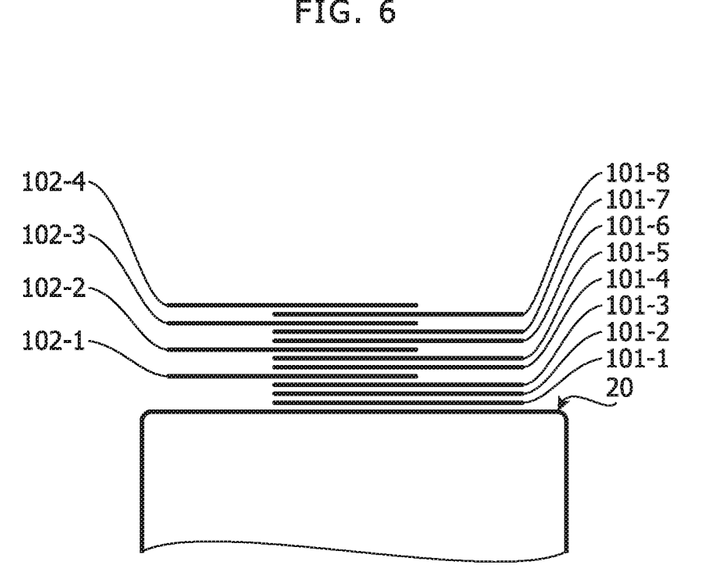
FIG. 6 shows a diagram that explains stacking arrangement of a document sheet 101-$i$ and a print sheet 102-$j$ on an output tray 20 in a copy operation with combination printing (here, 2 in 1 printing) in the image forming apparatus shown in FIGS. 1 and 2.

FIG. 6 shows a diagram that explains stacking arrangement of a document sheet 101-i and a print sheet 102-j on an output tray 20 in a copy operation with combination printing (here, 2 in 1 printing) in the image forming apparatus shown in FIGS. 1 and 2. If combination printing is performed, the number of the print sheets 102-j is less than the number of the document sheets 101-i, and as shown in FIG. for example, after a predetermined delay (in FIG. 6, corresponding to one document sheet 101-i), one print sheet 102-j and plural (here, two) document sheets 101-i are stacked alternately on the output tray 20. In FIG. 6, four print sheets 102-1 to 102-4 are outputted correspondingly to eight document sheets 101-1 to 101-8.

As shown in FIGS. 5 and 6, in a width direction of the output tray 20, a bunch of the document sheets 101-i and a bunch of the print sheets 102-j are stacked so as to be shifted from each other, and therefore, if a user holds the bunch of the document sheets 101-i and the bunch of the print sheets 102-j with user's right and left hands respectively and pulls them from each other, the user can easily separate the bunch of the document sheets 101-i and the bunch of the print sheets 102-j from each other.

As mentioned in the aforementioned embodiment, onto the output tray 20, a document is outputted from the image scanning device 2 and a print sheet is outputted from the printing device 1. The controller 33 performs a copy operation, and in the copy operation, the controller 33 causes the printing device 1 to print an image based on a document image scanned by the image scanning device 2. Further, the printing device 1 includes the outlet 20a of the print sheet, and the image scanning device 2 includes the outlet 20b of the document; and the outlet 20b of the document outputs the document such that edges of the document and the print sheet in a width direction of the output tray are arranged at positions different from each other.

Consequently, as mentioned, in the copy operation, the document and the print sheet are outputted to the common output tray 20, and a user can easily separate the document and the print sheet from each other.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   an image scanning device configured to scan a document image sheet by sheet from a document including plural sheets; the image scanning device comprising of a first outlet through which the document will be ejected via a document path;
   a printing device; the printing device comprising of a second outlet through which a print sheet will be ejected via a print sheet path; the first outlet is independently arranged from the second outlet and is arranged at a higher position than the second outlet; the print sheet path is arranged separately from the document path and does not intersect with the document path;
   an output tray as an output destination of both the document outputted from the image scanning device and the print sheet outputted from the printing device; the output tray being arranged on a top surface of a housing of the printing device;
   a controller configured to perform a copy operation and causes the printing device to print an image based on the document image in the copy operation; the controller comprising of a processor that is configured to run a software process and a hardware process;
   wherein the image scanning device is arranged on the top surface of the housing of the printing device and wherein the first and second outlets output the print sheet and the document such that edges of the document and the print sheet in a width direction of the output tray are arranged at positions different from each other.

2. The image forming apparatus according to claim 1 wherein
   the image scanning device comprises an image scanning unit, and a transportation roller in a downstream side of the image scanning unit; and
   when the printing device performs the printing in parallel with the image scanning of the image scanning unit, the controller (a) stops transportation of a sheet of the document with nipping a rear end part of the sheet of the document using the transportation roller of the image scanning device, (b) causes the printing device to output the print sheet, and (c) causes the image scanning device to resume the transportation of the sheet of the document and output the sheet of the document after outputting the print sheet.

3. The image forming apparatus according to claim 1 wherein the controller causes the printing device to print the image on the print sheet so as to cause the print sheet to have a reverse orientation to the document.

* * * * *